United States Patent [19]

Agranier et al.

[11] 3,755,077
[45] Aug. 28, 1973

[54] NUCLEAR FUEL ASSEMBLY

[75] Inventors: Jean-Claude Agranier, Cornillon-Confoux; Andre Chalony, Aix-en-Provence, both of France

[73] Assignee: Commissariat A L'Energie Atomique, Paris, France

[22] Filed: Sept. 14, 1970

[21] Appl. No.: 71,998

[30] Foreign Application Priority Data
Sept. 17, 1969 France .............................. 6931617

[52] U.S. Cl. ........................ 176/78, 176/76, 176/81
[51] Int. Cl. ............................................ G21c 3/32
[58] Field of Search .................. 176/76, 78, 79, 81, 176/30, 87

[56] References Cited
UNITED STATES PATENTS

| | | | |
|---|---|---|---|
| 3,574,058 | 4/1971 | Gumuchian | 176/68 |
| 3,150,057 | 9/1964 | Monson et al. | 176/81 |
| 2,961,393 | 11/1960 | Monson et al. | 176/78 X |
| 3,573,169 | 3/1971 | Gumuchian | 176/78 |
| 3,169,097 | 2/1965 | Meyers | 176/79 |
| 3,276,967 | 10/1966 | Dodd | 176/79 X |
| 3,291,698 | 12/1966 | Fortescue | 176/81 X |
| 3,303,099 | 2/1967 | Johnston | 176/79 X |

Primary Examiner—Carl D. Quarforth
Assistant Examiner—G. G. Solyst
Attorney—Cameron, Kerkam & Sutton

[57] ABSTRACT

A fastening system for retaining a compact bundle of fuel pins longitudinally in the fluid coolant guide shroud of a nuclear fuel assembly comprises two parallel rods attached transversely to a tube retained by the shroud and contained therein, parallel rails which slide on the rods and split tubes which each slide on a rail and slide thereon and in the plugs of the fuel pins of a same layer to retain the pins on the rail. The guide members are retained by the shroud.

5 Claims, 3 Drawing Figures

Patented Aug. 28, 1973 3,755,077
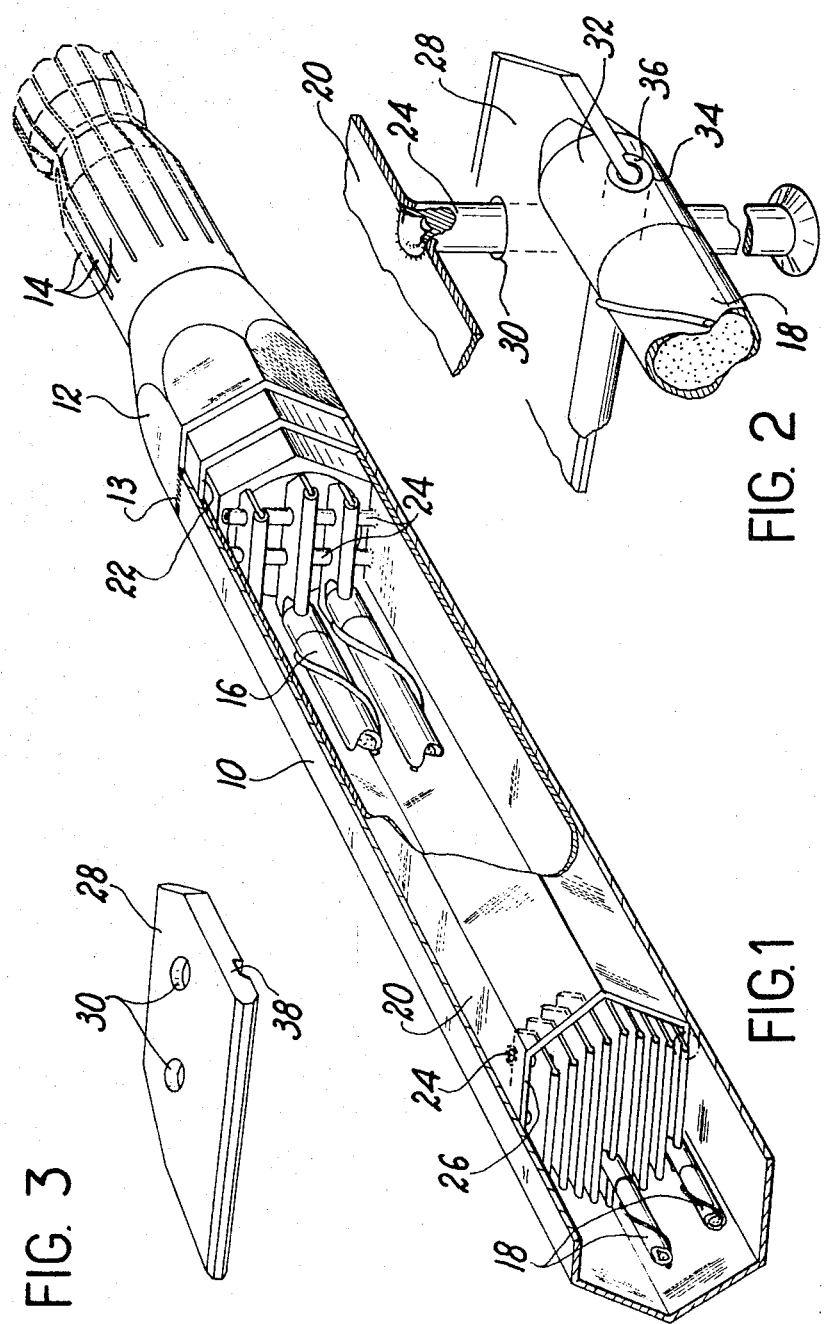

NUCLEAR FUEL ASSEMBLY

This invention relates to a fastening system for connecting the fuel pins to a support associated with the assembly, in a fuel assembly of the kind comprising a bundle of fuel pins grouped contiguously in a regular pattern.

Fuel assemblies adapted for use in high power density nuclear reactors, such as breeder reactors cooled by the circulation of molten metal, comprise one or more bundles of canned fuel pins disposed in a jacket through which the fluid coolant flows. The pins must be retained in the jacket. As a rule, the pins of each bundle are mounted on a grid borne by the base of the jacket or by a ring attached to the straight portion thereof. The distance apart of the pins is determined by spacers associated therewith and as a rule formed by a wire helically wound on to each pin.

In the prior art systems the fuel pins had as a rule to be threaded individually on to the grid. Clearly, this method has considerable disadvantages, since operations must be performed in particularly difficult conditions, due to the $\gamma$ radiation protection which must be provided during assembly. Moreover, the rails determine the distance apart of the layers of pins attached thereto, at least in the end portion of the layers, whereas the bundle can be made as compact as possible if the pins are allowed to take up a contiguous position, in which case their distance apart is determined exclusively by the spacing wires.

The invention provides a fastening system which meets practical requirements more satisfactorily than the prior art systems, being more particularly free from the afore-mentioned disadvantages.

The invention relates to a fastening system for retaining the fuel pins longitudinally in a fluid coolant guide jacket, in a fuel assembly comprising a bundle of fuel pins grouped contiguously in a regular pattern, the system being characterised in that it comprises at least two parallel rods attached transversely to a tube unitary with the jacket and contained therein; parallel rails which slide on the rods and extend beyond the terminal edge of the tube; and guide members which are each associated with a rail and slide thereon and in the plugs of the fuel pins, forming a single layer to retain the pins on the rail, the guide members being immobilised by the jacket when the jacket is therein.

The invention will be better understood from the following description of a non-limitative exemplary embodiment thereof, with reference to the accompanying drawings, wherein:

FIG. 1 is a perspective view of the lower end portion of a fuel assembly, certain members being removed and only a small number of fuel pins being shown;

FIG. 2 is a detail, to an enlarged scale, of that part of the system associated with a fuel pin which is enclosed by a chain-dot circle in FIG. 1; and FIG. 3 is a perspective view, to an enlarged scale, of one of the rails of the system illustrated in FIG. 1.

A fuel assembly, the lower end portion of which is shown in FIG. 1, comprises a jacket 10 formed by a sheath of regular hexagonal cross-section and a solid base 12 having claws 14 through the base 12 is retained on a grid (not shown). The base 12 is formed with an axial passage through which a fluid coolant enters the jacket 10. The sheath is welded to the base 12 at 13.

Disposed in the jacket 10 are a number of superimposed bundles of fuel pins. The lower bundle is formed by pins 16 containing fertile material. The pins 16, few in number and of a relatively large section, can be attached to the base 12 by a conventional system. On the other hand, the second bundle is formed by pins 18, which are of smaller section than the pins 16, are occupied by fissile material and are attached to the jacket by the system according to the invention.

The system according to the invention comprises a thin tube 20 of regular hexagonal section mounted with a small clearance in the jacket 10, and the inner tube 20 is welded at 22 to an end shoulder of the base 12. Extending through the tube 20 are two parallel rods 24 perpendicular to the tube axis and disposed adjacent upper edge 26 and the rods 24 must be so attached that they do not project out of the tube. To this end use can be made inter alia of members formed by a cylindrical rod having at one end a head having a frusto-conical bearing surface, and at the other end a cavity leaving only an annular lip. Accordingly, the tube 20 is then formed with a recess embossed inwardly through which rod 24 extends and providing a bearing surface having a shape matching that of the head of the rod 24 and when the rod is in place, therefore, and the lip is turned down over the edges of the matching reinforcement, the rod does not project outside the straight section of the tube 20, as shown in FIG. 2.

Clearly, at least two rods 24 are needed, but more can be provided, as may be advantageous in certain cases.

Engaging over the rods 24 are the same number of flat rails 28 as the number of layers of the bundle of fuel pins 18 to be assembled. The rails 28 have a shape elongated in the direction of flow of the heat-transfer fluid. The holes 30 with which the rails 28 are formed for the rods 24 to extend through advantageously leave a clearance such that the rails can be slightly inclined to allow the fuel pins to occupy a contiguous position.

End plug 32 closing each fuel pin 18 has a slot large enough transversely to admit a rail 28, the slot terminating in a semi-cylindrical passage 34. Each fuel pin 18 is connected to the corresponding rail 28 by an intermediate guide member 36 taking the form of a split tube of outside diameter such as to enable the guide member to slide in passages 34 and the slot in the guide member 36 is wide enough to enclose a narrowed portion 38 of the rails (FIG. 3). When the guide member is introduced into the passages 34 in a layer of fuel pins and engages around the corresponding rail 28, therefore, the fuel pins of the layer are longitudinally immobilised in relation to the rail, although they remain free to slide. The resulting longitudinal connection is very robust, since the guide member is engaged by the passage 34 in the plug 32 which prevents the guide member from being opened up by the tractional forces to which it is subjected.

The advantage of the invention is at once apparent from a description of the method of assembly which it allows: first of all, the necessary layers of fuel pins are built up by placing a suitable number of pins on guide members 36 having a length corresponding to that of the rails 28 which are to receive them. The assembly formed by the tube 20 of hexagonal section, the rods 24 and the rails 28 is prepared independently. To this end, the tube 20 is pierced, the periphery of the holes is turned down internally, the rods are introduced through the holes in the tube 20 and the rails 28, the ends of the rods are fixed and made flush with the outside surface of the tube 20: all the operations can be performed on the tube 20 in a normal atmosphere.

When these operations have been completed, the fuel pins are put in place layer by layer, by threading the guide members 26 of each layer on to the corresponding rails 28. When all the layers are in place, the tube 20 and the fuel pins 18 are placed en bloc on to the base 12 and the tube is welded. The fuel pins 18 and the tube 20 can have been first of all introduced into the sheath of the jacket 10, thus immobilising the guide members 36 and the fuel pins 18 transversely: in that case it is enough to lift the sheath slightly to obtain access to the welding zone.

The fuel pins 18 remain free to slide on their guide members 36 and move slightly transversely of the rails, since the latter can incline. Consequently, the fuel pins can be tightened to force them to form a compact bundle in which their distance apart is determined exclusively by the contacting of the helically wound spacing wires.

Clearly, very many variants can be adopted, more particularly, not only one bundle of fuel pins, but a number of bundles of the same assembly can be mounted by the arrangement disclosed hereinbefore. The rods can be fixed by many different methods. Lastly, the guide members 36 can have shapes other than split tubes. The invention of course covers the afore-mentioned variants, and in general all variants which are technical equivalents.

We claim:

1. A nuclear fuel assembly comprising a fluid coolant guide shroud, a bundle of parallel elongated fuel pins arranged in regular array in said shroud, and means for retaining said pins in said shroud, comprising the following: a tube having a sliding fit in and secured to said shroud; at least two parallel rods extending transversely of and secured at their ends to said tube; parallel rails slidable and transversely mounted on said rods and extending beyond a terminal edge of said tube; a guide member slidably mounted on each of said rails and an end plug for each of said fuel pins slidably mounted on the adjacent one of said guide members forming a single layer of said bundle to retain said pins on said rail, said guide members being retained by said shroud on said rails.

2. A fuel assembly as set forth in claim 1, said guide member being a split tube, a semi-cylindrical passage in each of said end plugs slidably receiving said tube, and a narrowed portion, on each of said rails receiving an edge of the split of the corresponding one of said tubes.

3. A system as set forth in claim 1, wherein each rod has a cylindrical portion on which said rails slide, a head comprising a flared surface bearing against an opening in said tube of matching shape, and an end portion riveted into said opening in said tube.

4. A fuel assembly as set forth in claim 1, including apertures in said rails receiving said rods and of larger diameter than that of said rods, whereby said rails can tilt with respect to said rods.

5. A fuel assembly as set forth in claim 1, said shroud being a tubular prismatic sheath, an end portion for said sheath through which the coolant enters, said shroud and said tube being welded to said end portion, said tube containing a second bundle of fuel pins of fertile material.

* * * * *